United States Patent [19]

Hwang

[11] Patent Number: 4,899,642
[45] Date of Patent: Feb. 13, 1990

[54] PNEUMATIC COMBINED WITH HYDRAULIC BRAKE CHAMBER

[76] Inventor: Chrang-Chuan Hwang, 2F, No. 108-1, Fu-Hsing St., Baan-Chyau City, Taipei Hsien, Taiwan

[21] Appl. No.: 257,007

[22] Filed: Oct. 13, 1988

[51] Int. Cl.$^4$ .................. F01B 31/00; F15B 13/00
[52] U.S. Cl. ...................... 91/510; 91/519; 91/1; 92/108; 92/109
[58] Field of Search .................. 92/108, 109; 91/509, 91/510, 519, 1

[56] References Cited

U.S. PATENT DOCUMENTS

| | | | |
|---|---|---|---|
| 3,338,553 | 8/1967 | Persicke | 92/109 X |
| 3,996,839 | 12/1976 | Norwood | 92/108 X |
| 4,242,947 | 1/1981 | Renner et al. | 92/108 |

FOREIGN PATENT DOCUMENTS

| | | | |
|---|---|---|---|
| 1062120 | 7/1959 | Fed. Rep. of Germany | 92/108 |
| 2650683 | 5/1977 | Fed. Rep. of Germany | 92/108 |
| 2811332 | 12/1978 | Fed. Rep. of Germany | 92/108 |
| 255190 | 4/1946 | Switzerland | 92/108 |

Primary Examiner—Robert E. Garrett
Assistant Examiner—Mark A. Williamson
Attorney, Agent, or Firm—Leonard Bloom

[57] ABSTRACT

The present invention provides a kind of pneumatic combined with hydraulic brake chamber, especially relating to a powerful hydraulic brake chamber which is highly stable, ready to provide high-pressure and high-speed actuation and easy to be assembled, dismantled and maintained powerful hydraulic. Said pneumatic type brake chamber is consisted of the following major parts:

| | |
|---|---|
| a cylinder body, | a cylinder cover, |
| a central shaft, | a shaft sleeve, |
| a piston, | a helical spring, |
| a connecting rod, | a coupling device, and |
| an alarm device, ect. | | in which, the pneumatic mechanism is constructed by said cylinder body, cylinder cover, shaft sleeve, piston and helical spring; the hydraulic mechanism is constructed by said central shaft, shaft sleeve, piston and helical spring; and the connecting mechanism is constructed by said connecting rod and the coupling device. In case of applying the foot brake, compressed air enters the pneumatic mechanism and actuates the piston, compresses the spring and produces a braking action through the actuation of the connecting mechanism first; then the high pressure hydraulic fluid enters the hydraulic mechanism and actuates the axle sleeve and the piston, compresses the spring and strengthens the braking action through the actuation of the connecting mechanism to increase the stability of the braking action of acquiring the firm, safe and powerful brake effect.

6 Claims, 6 Drawing Sheets

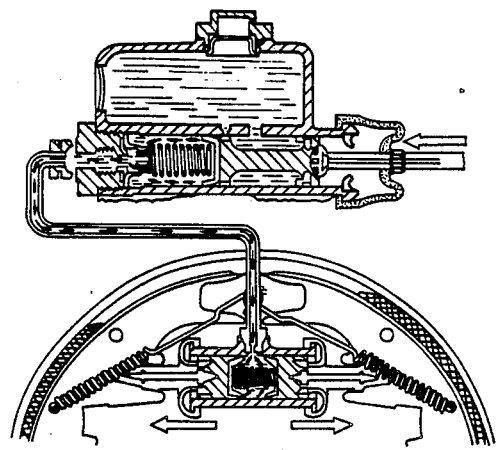
FIG — 1 PRIOR ART
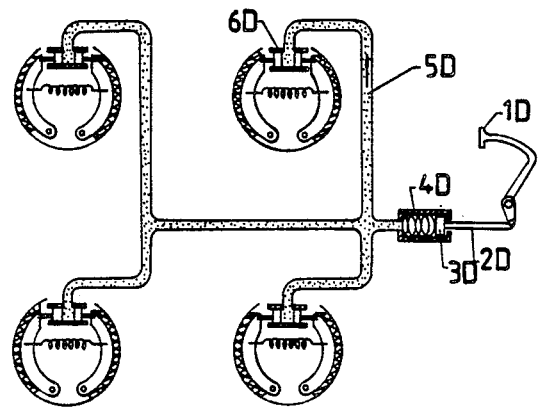
FIG — 2 PRIOR ART

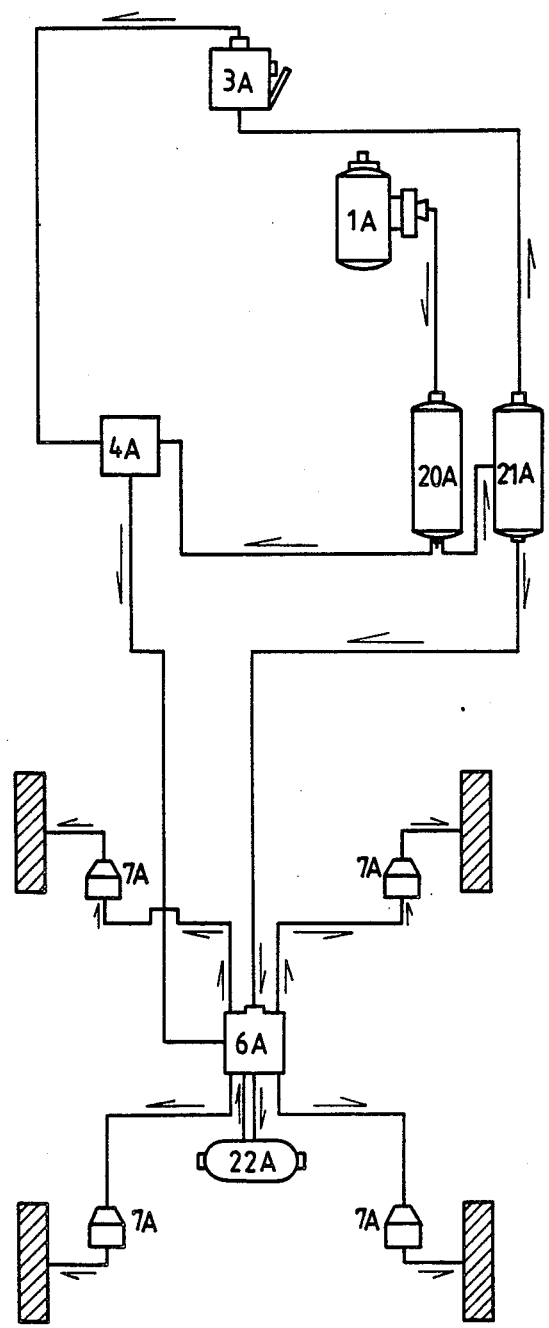
FIG — 4 PRIOR ART

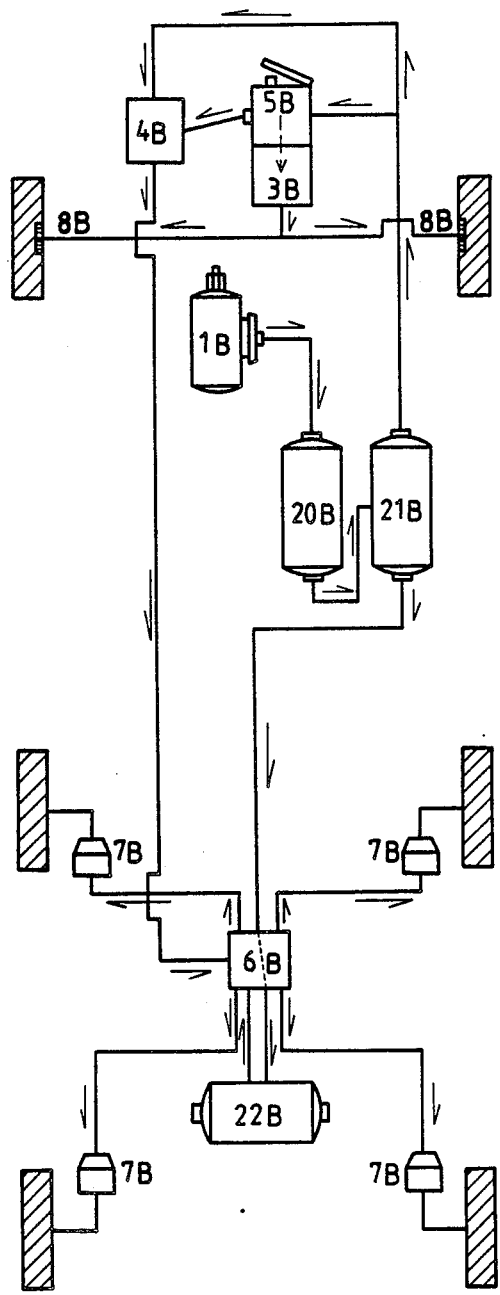
FIG — 6 PRIOR ART

PNEUMATIC COMBINED WITH HYDRAULIC BRAKE CHAMBER

FIELD OF THE INVENTION

The present invention relates to a safe and reliable brake system for vehicles which comprises a pneumatic and a hydraulic brake.

BACKGROUND OF THE INVENTION

Due to the development of the transport business, the strong and powerful brake system becomes a must for the big trailer and the big truck to guarantee the traffic safety. In general, the brake system can roughly be consisted of three following parts:

(1) single pneumatic brake device;
(2) single hydraulic brake device; and
(3) improved hydraulic brake device by
increasing the pneumatic pressure.

It is described as follows: the simple flow of the single pneumatic brake device is as follows: high pressure air is generated in an air compressor and delivered to the air reservoir then, flowed into the air reservoir through a pipeline and a check valve of car tail valve. When applying the foot brake pedal, high pressure air in the air reservoir flows through the control valve to the regulator and actuates the valve to be opened. Then, high pressure air in air reservoir flows through the regulator, reaches the car tail valve and opens the valve. Meanwhile, high pressure air from the reservoir also flows through car tail valve and enters each braking chamber for applying the braking actions. Besides, the structure of brake chamber consists of a cylinder supplied with a membrane inside, a helical spring, a force-receiving plate and a connecting rod attached to said plate. After compressed air flows into the cylinder through the inlet of the cylinder top, compressed air presses the membrane, and pushes the force-receiving plate and the connecting rod down, and actuate the brake membrane to accomplish the braking action. Its defect is that the membrane frequently vibrates and ruptures after a period of time. This will cause leakage and pressure release to interfere with the downward movement of the force-receiving plate and connecting rod and result in danger owing to the loss in brake effect. In a simple hydraulic brake device, the simple flow of the brake system is as follows: when applying the foot brake pedal, the connecting rod will be actuated and push the piston of the main cylinder for forcing the compressed fluid in the cylinder throughout the pipeline to every sub-cylinder and initiate the brake action. The deficiency is that the device is going to lose braking action and result in danger when there is leakage in the hydraulic system. Also, one must dismantle the wheel and the brake drum in the period of repairing. It is a time-consuming, energy-wasting and very inconvenient work. The brake system of the improved hydraulic brake device by increasing the pneumatic pressure is described as follows: high pressure air is produced by an air compressor, and delivered to the reservoir in which there is a check valve in the pipeline between the reservoir. When applying the pedal, high pressure air is delivered from the reservoir, flowing into the compressed air booster, actuating the brake fluid in the cylinder to generate high pressure and sending fluid to each sub-cylinder of the front wheel of the trailer, thereby accomplishing the high pressure hydraulic brake effect. The booster is furnished with a pipeline connected to the adjusting valve which can be opened by high pressure air come from the booster and let high pressure air from the reservoir flow through the valve, deliver to a second valve and open the valve gate of car tail valve. Also, high pressure air from the reservoir flows through the second valve, is delivered to every braking chamber and generate a high-pressure-air brake effect. The cylinder, the sub-cylinder and braking chamber are all conventional. However, the defects of the brake device for each wheel are that it can only generate the simple brake effect, and cannot increase its safety. If is has fluid-leakage or membrane rupture in the cylinder, the brake system is going to fail. Besides, for inspection and repair, one must dismantle the wheel and braking drum for checking the sub-cylinders and auxiliary pipelines except checking main cylinder. It is a time-consuming and energy-wasting work. The above-mentioned conventional brake device cannot guarantee the traffic safety for high powerful trailer and big truck. If the brake is non-working, it can result not only in time-wasting for repairing but also seriously threaten and endanger human life, the vehicle and buildings.

SUMMARY OF THE INVENTION

A major object of the present invention is to supply a safe and reliable pneumatic type hydraulic brake supplied with both the pneumatic and the hydraulic double systems.

A second object of the present invention is to supply the improved pneumatic type hydraulic brake chamber in which the brake effect is accomplished by the actuation of the pneumatic system first and followed by the actuation of the hydraulic systems.

A further object of the present invention is to supply a high-pressure and high-speed pneumatic type hydraulic brake chamber.

Another object of the present invention is to supply a pneumatic type hydraulic brake chamber which is easy for maintaining and repairing.

Techniques, equipment, accessories and its effects for the above and other objects, features and advantages of the present invention will become more apparent from the following description when taken in conjunction with the accompanying drawings in which preferred embodiments of the present invention are shown by way of illustrating example. But, special terms of the equipment and accessories are only for explanation, not for limiting its meaning.

BRIEF DESCRIPTION OF THE DRAWINGS

FIG. 1 is an illustrated drawing for main brake cylinder and the brake sub-cylinder of the conventional hydraulic brake system.

FIG. 2 is a flow diagram of the conventional hydraulic brake system.

FIG. 4 is a flow diagram of the conventional pneumatic brake system.

FIG. 6 is a flow diagram of the conventional improved hydraulic brake system by increasing the pneumatic pressure.

DESCRIPTION OF THE PREFERRED EMBODIMENTS

Figure 8:
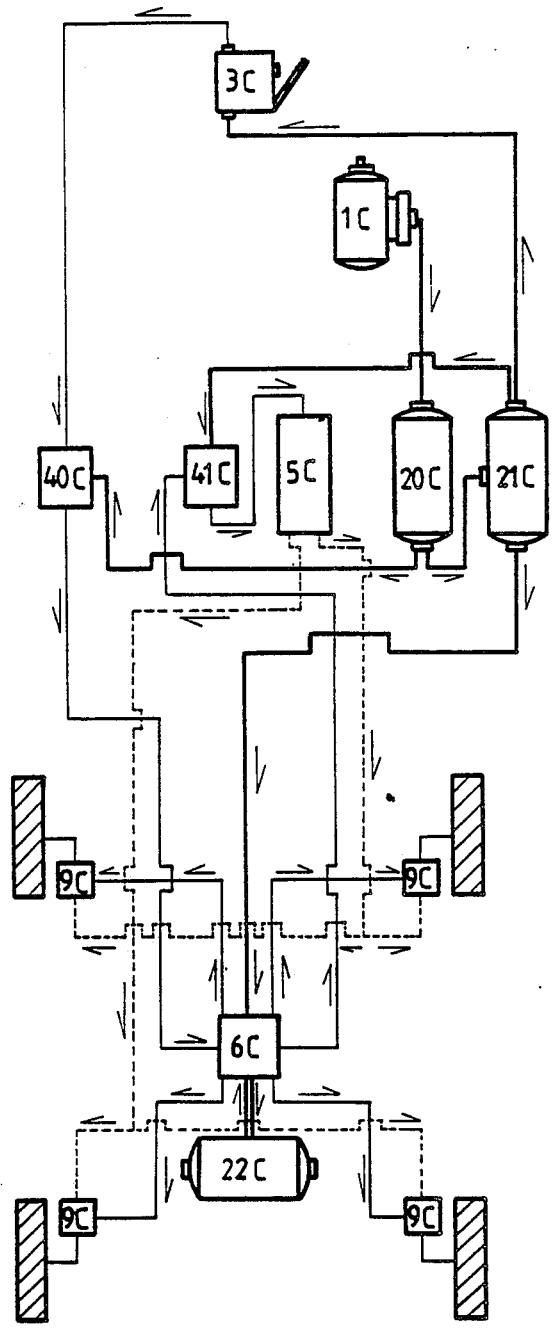
FIG. 8 is a flow diagram of the present invention "pneumatic combined with hydraulic brake chamber".

The present invention is to provide a pneumatic combined with hydraulic brake chamber which can fit the actuation of car tail valve. The installed location of the present invention in whole brake system and the flow diagram of the present invention are described as follows: (see FIG. 8, the heavy line represents the filling loop for pneumatic; the narrow line represents the pneumatic brake loop; the dotted line represents hydraulic brake loop).

High pressure air is generated in air compressor 1C and sent to the reservoir 20C, 21C and 22C in which a pipeline is provided in between the reservoir 21C and the valve 3C. In case of paddling (pressing) down the brake, the valve 3C is opened, then compressed air is sent to the regulating valve 40C which will actuate the valve 40C to open and push high pressure air in reservoir 20C to be delivered to the car tail valve 6C through the valve 40C to actuate the valve 6C to open. Meanwhile, pneumatic combined with hydraulic brake chamber 9C according to the present invention through the car tail valve and accomplishing the pneumatic brake effect. Besides, compressed air is delivered to the regulating valve 41C through the valve 6C by means of installing a pipeline in between the valve 41C and the reservoir 21C and actuates the valve 41C to open, pushes high pressure air in the reservoir 21C to flow to the hydraulic brake device by increasing the pneumatic pressure 5C through the valve 41C. Then pressure of the inside fluid in the device 5C will be at a high level. Finally, the high pressure fluid is sent to each pneumatic combined with hydraulic brake chamber according to the present invention and complete the brake action of the auxiliary hydraulic brake.

Figure 3:
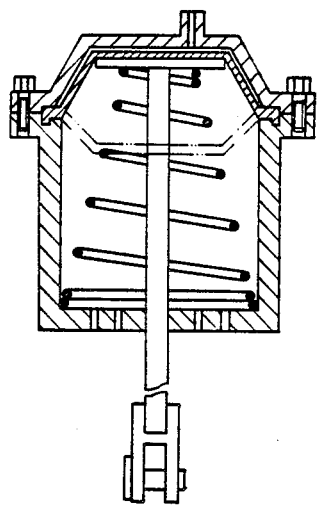
FIG. 3 is a sectional view for the brake chamber of the conventional pneumatic brake system.
Figure 5:
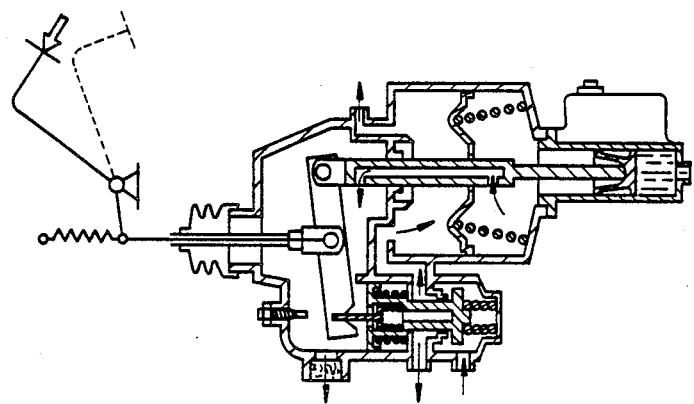
FIG. 5 is a sectional view for the compressed air booster of the conventional improved hydraulic brake system by increasing the pneumatic pressure.
Figure 7:
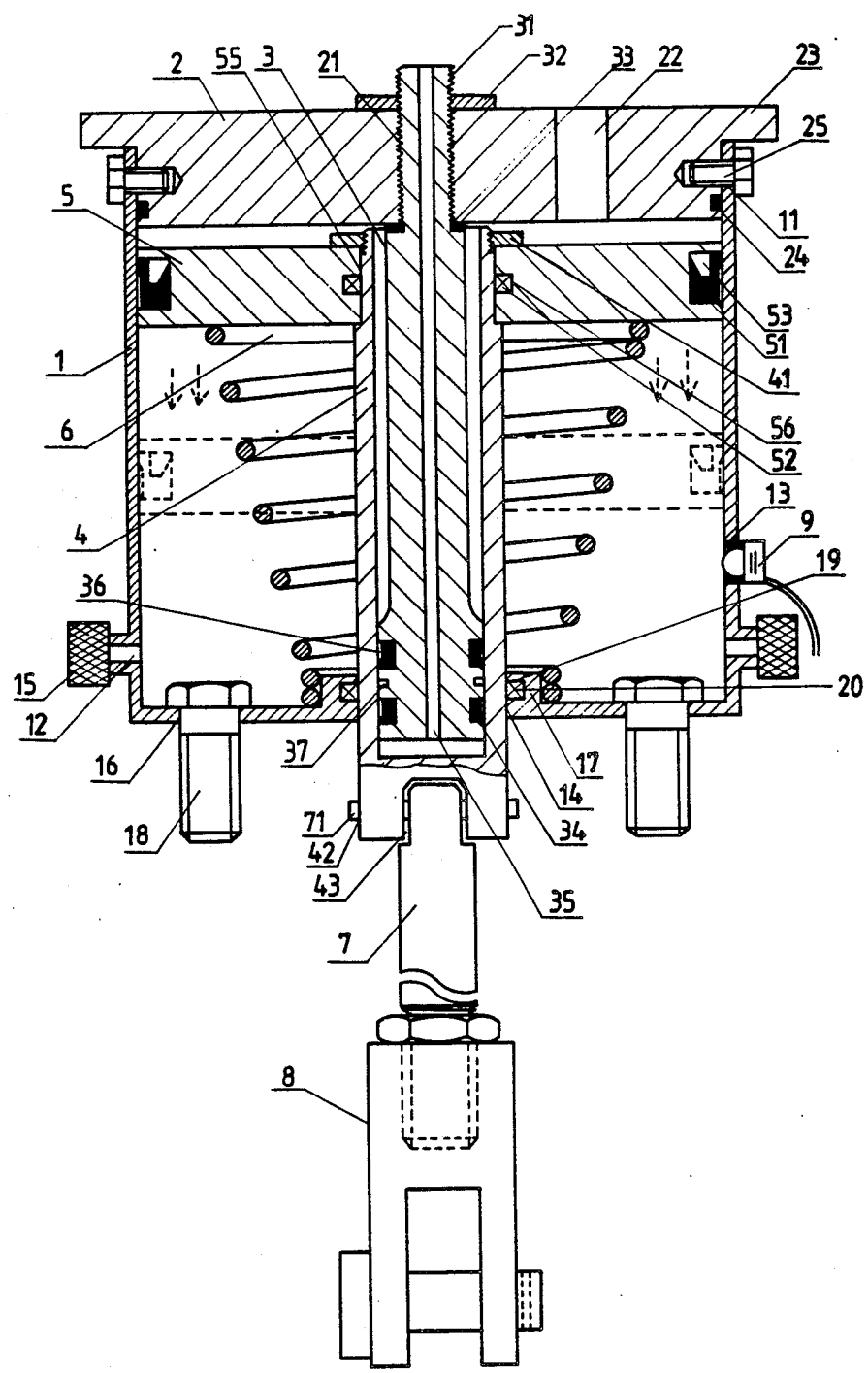
FIG. 7 is a sectional view for the brake chamber of the present invention "pneumatic combined with hydraulic brake chamber".

The present invention is a device which has both pneumatic and hydraulic brake effects. If necessary, a magnetic valve can be installed on the valve 41C of the pneumatic system for regulating the time lag of the braking action in between the auxiliary hydraulic brake and the pneumatic brake to meet the need of users. Following are the detailed description on structure and functions for the pneumatic combined with hydraulic brake chamber according to the present invention:

Referring to FIG. 7, the present invention is mainly consisted of a cylinder body 1, an upper cover 2, a central shaft 3, a sleeve 4, a piston 5, a helical spring 6, a connecting rod 7, a coupling device 8 and an alarm device 9, in which, said body 1 having a hollow cylindrical shape is furnished with several screw holes 11 on the upper portion of its wall, a screw hole 13 and several vents 12 supplied with air filtering net 15 on the proper portion of its lower wall, and a convex ring 17 on the center of the bottom. There is an opening 14 on the center of the convex ring 17, in which, a groove 19 with an anti-wearing gasket ring 20 is furnished on the ring surface of the opening and several screw holes 16 are furnished on the outside portion of the opening 14 in order to secure the body 1 on the car body with the screw 18. Said cover 2 having a round plate shape and set up on the upper portion of the body 1 is furnished with a screw hole 21 on the center and a vent 22 on the suitable portion. Besides, there is a flange 23 on the circumferential edge. At the bottom of the flange 23 on the cylinder body 1, there are several screw holes 11. Screws 25 are disposed in the screw holes 11 to secure the upper cover 2 to the body 1 and a gas-tight seal is effected by a ring 24 in a circular concave groove.

Said shaft 3 having conical tapered shape which is smaller in diameter at upper end and larger in diameter at lower end is furnished with a hollow hole (central bore) 35 at the center and a screw thread 31 on the top. It can be assembled by threading the shaft through the hole 21 of the cover 2 and being secured on the cover 2 by using the nut 32. Besides, the bottom portion is larger in diameter and furnished with several concave troughs (grooves) 36 for installing the O-ring 34. More than one sludge retaining trough (groove) 37 are furnished in between the trough (grooves) 36 for accumulating oil to increase the lubricating effect and intercepting oil and sludge. Said shaft sleeve 4 having hollow cylindrical shape is furnished with an empty space on the center for the up and down sliding movement of the shaft 3 along the space. The length of the hollow chamber is longer than the shaft 3 from the lower edge of the upper cover to the end of the shaft 3 in order to maintain a space between the surface and the bottom of hollow chamber in order to maintain pushing force cause by oil pressure for shaft sleeve 4. On the top of the shaft sleeve, there is a small diameter portion which is provided with the screw thread and the fixing screw nut 41. The lower portion is encased in the hole 14 of the cylinder body and protrudes from the body 1 and is furnished with a concave trough (groove) and pin hole in order to connect with the rod 7. When high pressure fluid enters into the shaft 3 and reaches the sleeve 4, the sleeve 4 is pushed downwardly by hydraulic pressure. Said piston 5 having round plate shape is provided with a hole 55 which can be encased on the small diameter portion of the sleeve 4 and secured firmly with a screw nut 41. A ring concave trough (groove) 56 supplied with an O-ring 52 for gas-sealing is provided on the inside wall of the hole 55. A circular concave trough (groove) 53 with gas-tight ring 51 is provided on the circumference of the piston. Said piston is closely assembled on the inside of the cylinder body and secured firmly on the top of the sleeve 4 with the nut 41 for dividing the cylinder body 1 into upper and lower hollow chambers according to the gas-tight rank. When the sleeve 4 is downwardly compressed by high hydraulic pressure, the piston also goes down, when the piston is downwardly compressed by high pneumatic pressure, the sleeve also follows the piston down. Said spring 4 set up in the lower air chamber of the cylinder body 1 is encased on the outer portion of the sleeve 4. Its top portion is touched and supported on the lower portion of the piston 5 and the lower portion is encased on the outer portion of the ring-shaped convex ring 17 of the cylinder body 1. Because spring 6 is a restoring spring, the spring 6 is going to be compressed by the piston 5. Air in the lower hollow chamber is displaced and exhausted through the vent 15 due to the piston 5 pressing down by high pneumatic pressure or the sleeve 4 pressing down by high hydraulic pressure and pushing the piston 5 down in case of paddling (pressing) the brake pedal. The spring 6 is going to lift the piston 5 and actuate the sleeve to be restored to the original position before applying the brake. At this moment, air is sucked into the lower hollow chamber through the vent 15. Said rod 7 and said device 8 are provided on the lower portion of the sleeve 4, the rod 7 consists of a coupling sleeve 71 and the sleeve 4. The rod 7 and the device 8 are used for transmitting the movement of the sleeve 4, and pushes the lining to initiate the braking action in which the functions are conventional.

Said alarm device 9 installed in the hole 13 of the cylinder body lower portion consists of a round ball (detent) and an alarm, in which, the alarm is conventional. The round ball 91 is provided in front of the alarm and a part of curved surface is protruded into the inside of the cylinder body. When the lining on the brake drum is worn or affected to cause the slit of the brake to exceed the safety slit for any reasons, the piston 5 is going to touch the ball 91 and push the ball backwardly and initiate the alarm which will actuate the signal lamp on instrument board to warn the operator of the need for repairing due to the piston 5 over descending. Based on assembling of the above-mentioned elements, it can be divided into three parts of structures:

(1) pneumatic mechanism which consists of the body 1, the cover 2, the sleeve 4, the piston 5 and the spring 6;

(2) hydraulic mechanism which consists of the shaft 3, the sleeve 4, the piston 5 and the spring 6; and (3) driving mechanism which consists of the rod 7 and the device 8.

In case of paddling (pressing) the brake pedal, high pressure air enters in the upper hollow chamber of the cylinder 1 through the vent 22 of the cover 2 at first and compresses air to push the piston 5 and drive the sleeve 4 downwardly then actuate the rod 7, the device 8 and the brake drum in order to initiate the pneumatic braking action. High pressure fluid enters the inner portion of the sleeve 4 of the hydraulic mechanism through the hole 35 of the shaft 3 and presses the sleeve and actuates the piston to go down and initiate the rod 7 and the device 8, then conduct the brake drum for inciting the auxiliary hydraulic braking action. After releasing the brake pedal, the spring 6 compressed by the piston 5 is going to push the piston 5 back to the original position which is occupied before applying the brake and actuate the rod 7 and the sleeve 8 for restoring the brake drum to the original state to complete the firm pneumatic and hydraulic brake effect.

In case there is leakage resulting in a drop in hydraulic pressure of the hydraulic mechanism according to the present invention, the brake function is still safe due to the pneumatic mechanism working well as does the conventional pneumatic brake. On the other hand, it is safe in brake function if there is a leakage in the pneumatic mechanism which results in the pneumatic pressure shortage because the hydraulic mechanism working normally. Besides, the present invention does not use the conventional membrane, so it is not easy to be damaged during operation. If the brake drum is worn or affected to cause the slit of the brake to exceed the safe slit for any reasons, the piston in the cylinder body will touch the alarm and warn the operator of the need for repairing. Based on the complete brake alarming system furnished with both pneumatic and hydraulic safe brake system, the present invention offers the free-frommalfunction braking function.

In case of dismantling the present invention, unthread nut 32 and pull the cover 2 together with the piston 5 and the shaft 3 out from the sleeve 4. After this, it is ready for repairing the pneumatic mechanism only by dismantling the sleeve 71, and pulling the piston 5 together with the sleeve 4 out from the cylinder 1.

In case of assembling, it is very easy to accomplish only by adopting the reverse procedures for dismantling. It makes its maintenance work quite easy.

Based on the above description, the present invention brake and liquid pressure is a high pressure double brake device which has both pneumatic and hydraulic brake effects. Its brake effect is very stable and can highly assure traffic safety. Besides, it is supplied with an alarm in order to warn the operator when repairing is necessary. Furthermore, the repairing job is quite easy. Although this present invention is fully capable of achieving the functions and providing the advantages therein before mentioned, it is to be understood that it is merely the presently preferred embodiments thereof, and that I do not mean to be limited to the details of construction above described other than as defined in the appended claims.

What is claimed is:

1. A pneumatic and hydraulic brake system for vehicles having a plurality of wheels, the brake system being activated by an operator pressing on a brake pedal, the brake system comprising:

a means for providing compressed air;

a means for providing hydraulic fluid under pressure;

a conventional brake shoe apparatus;

a plurality of brake chambers, one at each wheel, each brake chamber having a cylinder, the cylinder having a cover and a bottom, the cover having an opening therein, the opening being connected to the source of compressed air, the bottom of the cylinder having an opening therein;

a piston within the cylinder, a sleeve having a first end connected to the piston and a second end slidably received in the opening in the bottom of the cylinder, the second end of the sleeve being connected to a rod, the rod connected to the conventional brake shoe apparatus, such that pressing on the brake pedal introduces compressed air into the opening in the cover of the cylinder forcing the piston and the sleeve toward the bottom of the cylinder, thereby pushing the rod to activate pneumatic braking of the brake shoe apparatus;

a shaft slidably disposed within the sleeve, the shaft having a central bore therethrough, the central bore being connected to the pressurized hydraulic fluid, the shaft having a first end and a second end, the first end connected to and extending from the opening in the cover, the second end communicating with the second end of the sleeve;

a helical spring disposed within the cylinder about the sleeve, the spring extending from the piston to the bottom of the cylinder;

such that pressing on the brake pedal introduces pressurized hydraulic fluid into the bore in the shaft which forces the sleeve and piston toward the bottom of the cylinder compressing the helical spring thereby pushing the rod to activate hydraulic braking of the brake shoe apparatus; and such that when the brake pedal is released the compressed air and the pressurized hydraulic fluid are disconnected, the spring urges the piston and sleeve to the position occupied before the brake pedal was pressed and the conventional brake shoe apparatus is deactivated.

2. The brake system of claim 1 further having an alarm system to alert the operator of wear of the brake shoe comprising:

the cylinder having a wall having an inside and an outside, the wall having an opening near the bottom of the cylinder; and a detent ball disposed outside the opening in the cylinder wall and protruding inside the cylinder wall through the opening such that when the piston moves downwardly near the bottom of the cylinder, the piston may contact the detent ball protruding inside the cylinder wall and press the ball outwardly to activate a conventional electrical circuit, thereby warning the operator.

3. The brake system of claim 1, wherein the means for providing compressed air comprises:

a high pressure air compressor, a plurality of compressed air reservoirs, a plurality of valves, pipeline to connect the air compressor to the reservoirs through the valves such that when the brake pedal is pressed, compressed air is directed to each brake chamber.

4. The brake system of claim 1, wherein the means for providing hydraulic fluid under pressure comprises a source of compressed air connected to a valve, the valve introducing the compressed air into a container of hydraulic fluid, the container of fluid connected by pipeline to each brake chamber.

5. The brake system of claim 1 further comprising the cylinder having a wall, the wall having a vent near the bottom of the cylinder and extending outwardly therefrom, an air filter mounted on the vent such that when the piston is moved downwardly, air in the cylinder is exhausted through the vent and when the piston is urged upwardly by the spring, air is replaced in the cylinder through the vent.

6. A pneumatic and hydraulic brake system for vehicles having a plurality of wheels, the brake system being activated by an operator pressing on a brake pedal, the brake system comprising:

a means for providing compressed air;

a means for providing hydraulic fluid under pressure;

a conventional brake shoe apparatus;

a plurality of brake chambers, one at each wheel, each brake chamber having a cylinder, the cylinder having a cover and a bottom, the cover having an opening therein, the opening being connected to the source of compressed air, the bottom of the cylinder having an opening therein;

a piston within the cylinder, a sleeve having a first end connected to the piston and a second end slidably received in the opening in the bottom of the cylinder, the second end of the sleeve being connected to a rod, the rod connected to the conventional brake shoe apparatus, such that pressing on the brake pedal introduces compressed air into the opening in the cover of the cylinder forcing the piston and the sleeve toward the bottom of the cylinder, thereby pushing the rod to activate pneumatic braking of the brake shoe apparatus;

a shaft slidably disposed within the sleeve, the shaft having a central bore therethrough, the central bore being connected to the pressurized hydraulic fluid, the shaft having a first end and a second end, the first end connected to and extending from the opening in the cover, the second end communicating with the second end of the sleeve;

a helical spring disposed within the cylinder about the sleeve, the spring extending from the piston to the bottom of the cylinder;

such that pressing on the brake pedal introduces pressurized hydraulic fluid into the bore in the shaft which forces the sleeve and piston toward the bottom of the cylinder compressing the helical spring thereby pushing the rod to activate hydraulic braking of the brake shoe apparatus;

such that when the brake pedal is released the compressed air and the pressurized hydraulic fluid are disconnected, the spring urges the piston and sleeve to the position occupied before the brake pedal was pressed and the conventional brake shoe apparatus is deactivated;

further having an alarm system to alert the operator of wear of the brake shoe comprising the cylinder having a wall having an inside and an outside, the wall having an opening near the bottom of the cylinder;

a detent ball disposed outside the opening in the cylinder wall and protruding inside the cylinder wall through the opening such that when the piston moves downwardly near the bottom of the cylinder, the piston may contact the detent ball protruding inside the cylinder wall and press the ball outwardly to activate a conventional electrical circuit, thereby warning the operator;

wherein the means for providing compressed air comprises a high pressure air compressor, a plurality of compressed air reservoirs, a plurality of valves, pipeline to connect the air compressor to the reservoirs through the valves such that when the brake pedal is pressed, compressed air is directed to each brake chamber;

wherein the means for providing hydraulic fluid under pressure comprises a source of compressed air connected to a valve, the valve introducing the compressed air into a container of hydraulic fluid, the containers of fluid connected by a pipeline to each brake chamber; and further comprising the cylinder having a wall, the wall having a vent near the bottom of the cylinder and extending outwardly therefrom an air filter mounted on the vent such that when the piston is moved downwardly, air in the cylinder is exhausted through the vent and when the piston is urged upwardly by the spring, air is replaced in the cylinder through the vent.

* * * * *